June 2, 1953 — L. F. FACHMAN — 2,640,777
VIEW-FINDER ATTACHMENT FOR CAMERAS
Filed Sept. 27, 1949 — 2 Sheets-Sheet 1
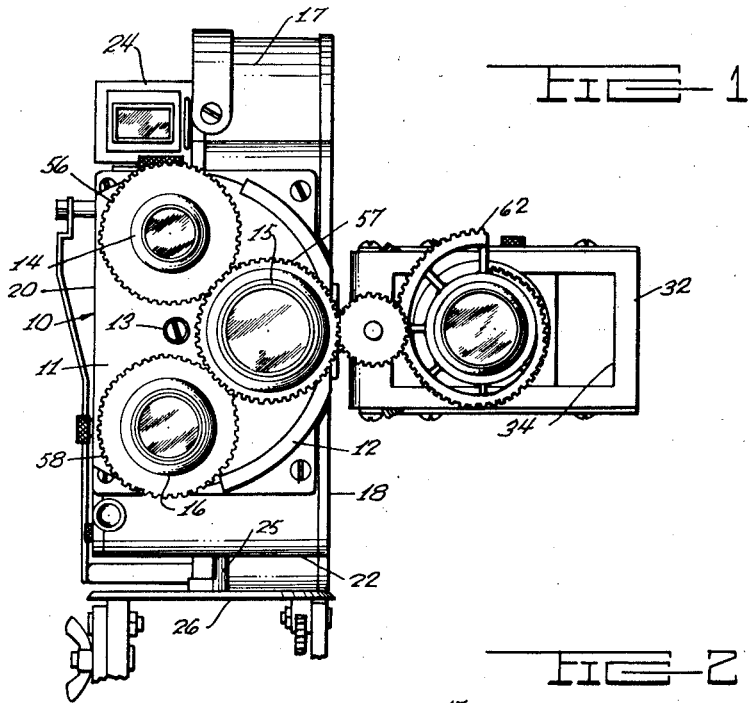
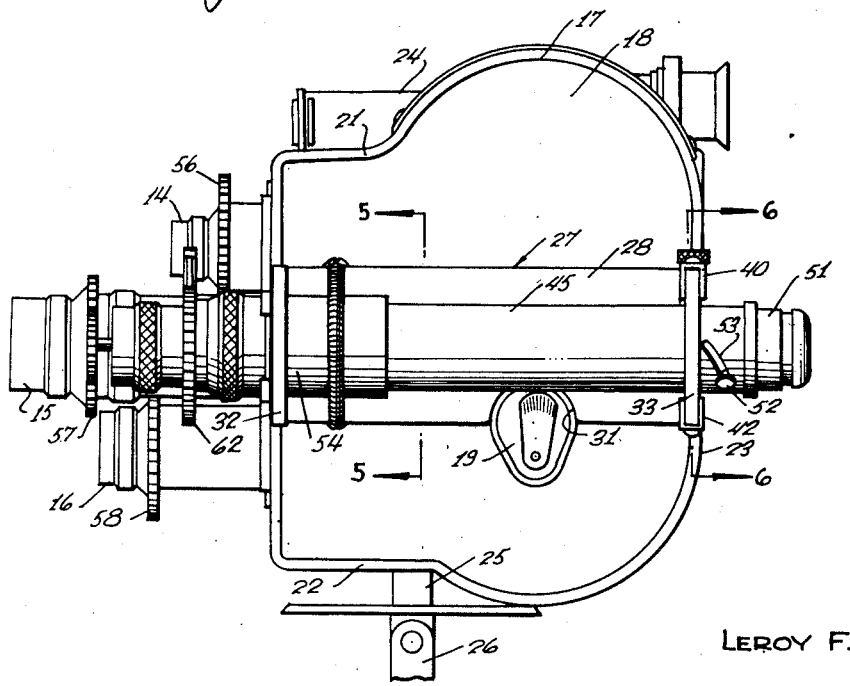
INVENTOR
LEROY F. FACHMAN
BY
*McMorrow, Berman & Davidson*
ATTORNEYS June 2, 1953     L. F. FACHMAN     2,640,777
VIEW-FINDER ATTACHMENT FOR CAMERAS
Filed Sept. 27, 1949     2 Sheets-Sheet 2
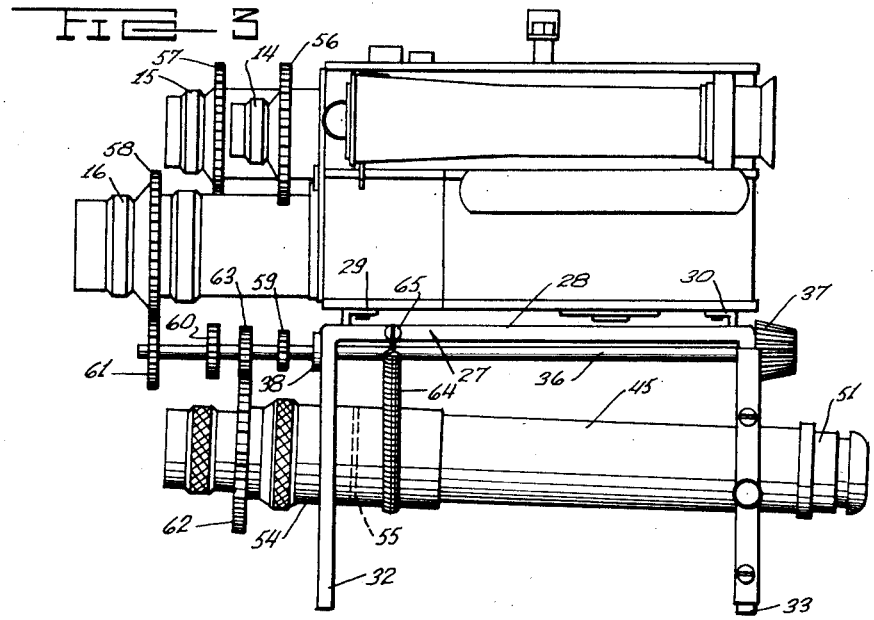
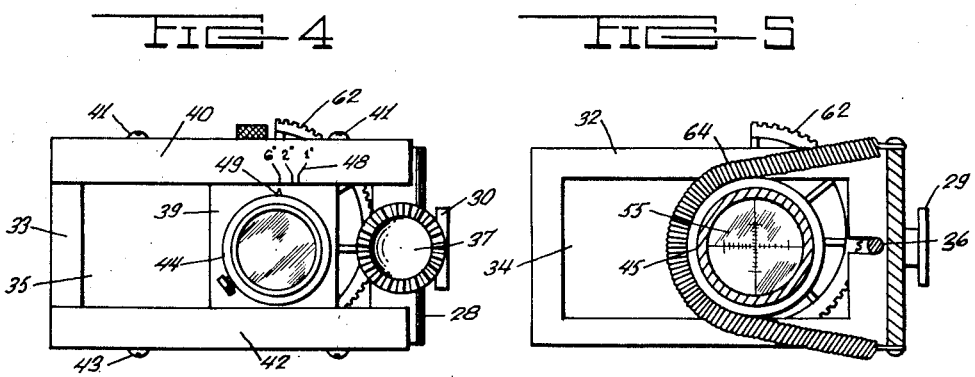
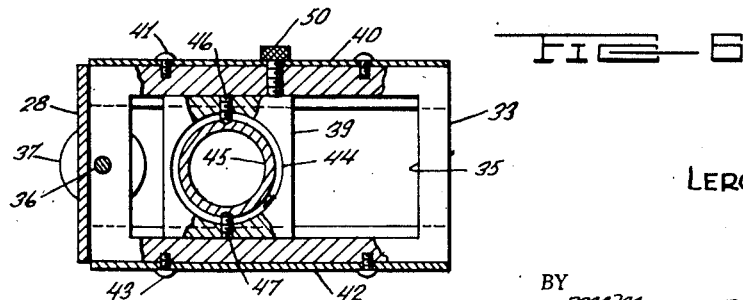
INVENTOR
LEROY F. FACHMAN
BY
McMorrow, Berman & Davidson
ATTORNEYS Patented June 2, 1953

2,640,777

UNITED STATES PATENT OFFICE 2,640,777

VIEW-FINDER ATTACHMENT FOR CAMERAS

Leroy F. Fachman, Port Clinton, Ohio

Application September 27, 1949, Serial No. 118,051

6 Claims. (Cl. 95—44)

This invention relates to view-finder attachments for cameras, and more particularly to such an attachment having means for automatically correcting parallax between the view-finder lens and the picture lens of the camera.

It is among the objects of the invention to provide a view-finder attachment for cameras, such as motion picture cameras, which can be quickly mounted on and detached from a camera and requires no material modification of the camera construction for its assembly with the camera, which is automatically adjusted for focusing at the same time the picture lens of the camera is focused and is automatically adjusted for parallax correction by the focusing operation, so that it will always view the same subject matter viewed by the picture lens of the camera, which does not interfere with the movement of a lens turret on the camera to selectively bring different lenses mounted on the turret to operative position, and is adjustable to the different focal lengths of such lenses, and which is of simple and durable construction, of light weight, economical to manufacture from readily available materials, easy to use, and adjustable without discontinuing operation of the camera.

Other objects and advantages will become apparent from a consideration of the following description and the appended claims in conjunction with the accompanying drawings, wherein:

Figure 1 is a front elevation of a known form of motion picture camera showing the attachment of a view-finder assembly illustrative of the invention thereto;

Figure 2 is a side elevation of the camera and view-finder attachment illustrated in Figure 1;

Figure 3 is a top plan view of the camera and view-finder attachment illustrated in Figures 1 and 2;

Figure 4 is a rear elevation of the view-finder attachment;

Figure 5 is a transverse cross-section of the view-finder attachment on the line 5—5 of Figure 2; and Figure 6 is a transverse cross-section of the view-finder attachment on the line 6—6 of Figure 2.

With continued reference to the drawings, the camera, generally indicated at 10, has a flat front wall 11 upon which is pivotally mounted a lens turret 12 by means of a pivot screw 13. The lens turret carries a plurality of lens assemblies, as indicated at 14, 15 and 16 of different focal lengths, such as 1-inch, 2-inches and 6-inches, respectively, and the turret is rotatable about the pivot screw 13 to selectively bring any one of these several lenses into operative position in registry with the shutter opening in the front wall of the camera. To the rear of the front wall 11, the camera provides a film receptacle 17 having a flat, removable side wall 18 secured in camera-closing position by a lock 19 and the camera further has an opposite side wall 20, a top wall 21, a bottom wall 22, and a rear wall 23. A conventional view finder 24 is shown mounted on the top wall of the camera at one side of the upper part of the film receptacle 17, and a screw-threaded lug 25 depends from the bottom wall for attaching the camera to a tripod 26.

As explained above, the camera is of known construction and constitutes no part of the present invention, except in the combination thereof with the novel view-finder attachment, and it is to be understood that the view-finder attachment may be applied to other cameras, and particularly to cameras having only a single lens, without in any way exceeding the scope of the invention.

The view-finder attachment of the present invention comprises an elongated, U-shaped bracket, generally indicated at 27, and preferably formed of a rectangular strip of metal plate, such as aluminum, brass or steel. This bracket has an elongated, rectangular bight 28 of a length substantially equal to the width of the side wall 18 of the camera and provided near its respectively-opposite ends with angularly-shaped, apertured feet 29 and 30 for the attachment of the bracket to the removable side wall of the camera in spaced, substantially parallel relationship to the camera side wall. This bight portion of the bracket is provided in one edge with an arcuately-shaped notch 31 to clear the camera lock 19, so that the removable side wall 18 can be attached to and removed from the camera without detaching the view-finder attachment.

The bracket 27 further comprises two spaced-apart, substantially parallel legs 32 and 33 which extend substantially perpendicularly from the bight 28 at the respectively-opposite ends of the latter. These legs 32 and 33 are provided with elongated, rectangular openings 34 and 35, respectively, and with mutually registering apertures between the bight portion 28 and the adjacent ends of these openings.

A manually-rotatable shaft 36 is journaled in the apertures in the two bracket legs and extends beyond the opposite ends of the bracket. A knurled hand knob 37 is secured on the shaft 36 at the outer side of the rear bracket leg 33 and a washer 38 is secured on the shaft at the outer side of the front bracket leg 32, the knob 37 and washer 38 restraining the shaft against longitudinal movement relative to the bracket while permitting free rotation of the shaft in the bracket. The shaft extends beyond the washer 38 and a plurality of spaced-apart gears are secured on this forwardly-extending portion of the shaft, as will be later described in detail. The shaft-receiving aperture in the leg 32 of the frame is in the form of a slot opening into the rectangular opening 35, so that the shaft can move away from the corresponding end of the bight or intermediate portion of the bracket when the lenses are changed, as will be later described in detail.

A substantially square mounting block 39 is slidably mounted in the opening 35 in the rear bracket leg 33. In order to provide suitable guideways for the mounting block, a thin-walled member 40 of channel-shaped cross-section is applied over the upper edge of the bracket leg 35 and secured thereto by suitable means, such as the screws 41. This member of channel-shaped cross-section extends at its open side inwardly of the opening 35 to provide a guide groove for the upper end of the mounting block 39, and a similar member 42 of channel-shaped cross-section receives the lower edge of the bracket leg 33 and provides, within the opening 35, a guide groove for the bottom end of the mounting block. The member 42 is secured to the bracket leg by screws 43 similar to the screws 41.

The mounting block 39 is provided with a centrally-disposed circular opening 44 and a cylindrical telescope tube 45 extends at one end through this opening in the mounting block. The telescope tube is swivelly connected to the mounting block by suitable means, such as the set screws 46 and 47 which are threaded through screw-threaded apertures provided in the mounting block between the upper and lower end surfaces of the block and the adjacent surface of the opening 44, and engaging the telescope tube 45 at their inner ends. This mounting will permit the telescope tube to swivel laterally toward and away from the side wall 18 of the camera.

The upper channel member 40 is provided on its rear face with indicia marks 48, and the mounting block 39 is provided with a pointer 49 which cooperates with the marks 48 to indicate the proper position of the mounting block for camera picture lenses of different focal lengths. The mounting block is secured in adjusted position relative to the indicating marks 48 by suitable means, such as the binding screw 50 threaded through a screw threaded aperture provided in the portion of the bracket leg 33 above the opening 35 and engaging, at its lower end, the upper end surface of the mounting block.

An eye piece 51, including a magnifying lens, is fitted into the rear end of the telescope tube 45 adjacent the mounting block 39, and is adjustable by suitable means, such as the headed pin 52 projecting from the eye piece through a spiral slot 53 provided in the tube 45.

A view-finder-lens assembly 54 is mounted on the forward end of the tube 45 and extends through the opening in the forward bracket leg 32 and forwardly of this bracket leg. A ground glass screen 55 is mounted within this lens assembly transversely thereof to receive an image focused thereon by the lens elements of the view-finder-lens assembly 54. This image is magnified by the magnifying lens contained in the eye piece 51.

The picture lenses 14, 15 and 16 of the camera are rotatably adjustable for focusing, and are provided with concentric gears 56, 57 and 58, respectively, for rotating them to adjust the focus thereof, and the forwardly-extending portion of the shaft 36 is provided with gears 59, 60 and 61 which mesh with the gears 56, 57 and 58, respectively, when the several picture lenses are brought to operative position, so that any picture lens in operative position can be adjusted for focusing by rotating the hand-knob 37. The gears 59, 60 and 61 have different numbers of gear teeth, corresponding to the variations in the focusing adjustments of the lens assemblies 14, 15 and 16 of respectively different focal lengths.

A spiral-shaped cam gear 62 is mounted on the view-finder-lens assembly 54, and a gear 63 is mounted on the shaft 36 and meshes with the cam gear 62. The view-finder-lens assembly 54 is of intermediate focal length, and the gears 62 and 63 have relative numbers of gear teeth such that the view-finding lens is accurately focused in coordination with any one of the camera picture lenses upon rotation of the lens-focusing shaft 36, and it will be noted that the picture lens and the view-finding lens are simultaneously adjusted by rotation of this shaft. The view-finding lens is thus automatically focused in coordination with the focusing of the picture lens in operative position on the camera.

An elongated tension spring 64 is connected at its ends to the upper and lower edges of the bracket bight 28 near the bracket front leg 32 by suitable means, such as the screws 65, and is passed around the outer side of the lens assembly 54. This spring resiliently pulls the forward end of the view finder and the corresponding end of shaft 36 toward the bight of the bracket and maintains the gear 63 in mesh with the gear 62 and the corresponding shaft and lens gears in mesh.

When the cam gear 62 is rotated to adjust the focusing of the view-finder lens and the operative picture lens, the view-finder lens will be moved either toward or away from the operative picture lens, depending upon the direction of rotation of the shaft 36. The arrangement is such that when the distance of the lens is shortened, the view-finder lens will move toward the picture lens and the axis of the view-finder lens will then be disposed at a slight angle to the axis of the picture lens and will intersect the axis of the picture lens at the focal plane of the latter. As the distance of the picture lens is increased, the view-finder lens will be moved away from the picture lens and the point of intersection between the axes of the picture lens and the view-finder lens will be moved away from the picture lens and will be maintained substantially in the focal plane of the picture lens. The view-finder lens thus always views exactly the same subject matter that the picture lens views and the axes of the picture lens and the view-finder lens do not become substantially parallel unless the picture lens is focused at infinity.

The spring 64 permits freedom of movement of the front end of the telescopic view finder away from the camera, so that the lens turret 12 can be rotated to bring any one of the several picture lenses into operative position without interference by the view-finder attachment, and the adjustable mounting block 39 provides the proper compensation of the angularity between the axis of the view-finder lens and the axis of the picture lens for picture lenses of different focal lengths.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a camera having movably mounted adjustable lens assemblies selectively movable to operative position, and focus adjusting gears mounted one on each lens assembly, a view finder attachment comprising a U-shaped bracket having elongated openings in its legs and having its bight attached to one side of the camera, an apertured mounting block adjustably mounted in the opening in one of said legs, a telescope tube pivotally mounted near one end in said mounting block and extending through the elongated opening in the other leg of said bracket, a rotatably adjustable lens assembly on the other end of said tube, a manually-rotatable shaft journaled in the legs of said bracket adjacent the bight thereof, a knob on said shaft at the outer side of said one bracket leg, gears on said shaft engageable respectively with the focusing gears on the several picture lens assemblies of the camera, a spiral-shaped cam gear on the lens assembly carried by said tube for adjusting the focus of such lens, a gear on said shaft meshing with said cam gear, gears on said shafts selectively meshable with said focus adjusting gears, and resilient means connected between said tube and said bracket maintaining said cam gear in mesh with the associated shaft-carried gear and the operative lens focusing gear in mesh with the corresponding shaft-carried gear while permitting said tube-carried lens to move toward and away from the operative camera picture lens as said shaft is rotated to simultaneously adjust the focus of the view-finder lens and the camera lens and vary the angular relationship between the axis of said view finder lens and the axis of the operative camera lens; said shaft being free to move toward and away from the bight portion of said bracket when said several picture lens assemblies are interchanged.

2. In combination with a camera including a lens carrying turret and camera lens assemblies of different focal lengths carried by said turret and selectively disposable in operative position relative to the camera, and wherein each of said camera lens assemblies includes a rotatable focusing ring, view finder means for said camera comprising a mounting bracket attached to said camera and having legs disposed one at each end thereof and extending outwardly from said camera, each of said legs having an opening therein, a telescope tube extending through the openings in the bracket legs and having on one end a view finder lens assembly disposed adjacent the selected camera lens assembly and provided with a rotatable focusing ring, means providing a pivotal connection between said telescope tube and the bracket legs remote from said view finder lens assembly, a spring connected between said telescope tube and said bracket resiliently urging said view finder lens assembly toward said selected camera lens assembly, a manually rotatable shaft journaled in said bracket, and gear means drivingly connecting said shaft with the focusing ring of the said view finder lens assembly, the last-mentioned gear means including a spur gear on said shaft and a spirally curved cam gear on the focusing ring of said view finder lens assembly and meshing with said spur gear to adjust the focus of said view finder lens assembly in accordance with changes in the focus of the selected camera lens assembly and provide movement of said view finder lens assembly relative to the selected camera lens assembly for adjusting the parallax relationship between the focal axes of said camera and said view finder in accordance with the changes in the focus of the lens assemblies.

3. In combination with a camera having lens assemblies of different focal lengths each provided with a focusing gear, and means supporting said lens assemblies on the camera for selective movement to operative position relative to the camera, and a view-finder mounted on said camera and having at one end a view-finder lens assembly disposed adjacent the operative camera lens assembly with its focal axis spaced from and substantially parallel to the focal axis of the operative camera lens assembly, means providing a pivotal connection between said view-finder and said camera spaced axially of said view-finder from said one end thereof to provide freedom of movement of said view-finder lens assembly laterally toward and away from said operative camera lens assembly for adjustment of the parallax relationship between the focal axes of said operative camera lens assembly and said view-finder lens assembly, a manually rotatable shaft extending longitudinally of said view-finder between said view-finder and said camera substantially parallel to the focal axis of said operative camera lens assembly and journalled in bearings carried by said camera, gears on said shaft selectively engaged by the gears on said camera lens assemblies as the latter are selectively brought to operative position relative to the camera for adjusting the focus of the operative camera lens assembly by rotation of said shaft, intermeshing gears mounted one on said shaft and one on said view-finder lens assembly for simultaneously adjusting the focus of said view-finder lens assembly when the focus of said operative camera lens assembly is adjusted, at least one of said inter-meshing gears having the shape of a spiral cam for moving said view-finder about said pivotal connection between the view-finder and the camera to adjust the parallax relationship between the focal axis of said view-finder lens assembly and the focal axis of said operative camera lens assembly as the focus of said lens assemblies is simultaneously adjusted, and resilient means connected between said view-finder and said camera maintaining said intermeshing gears in mesh with each other.

4. In combination with a camera having lens assemblies of different focal lengths each provided with a focusing gear, and means supporting said lens assemblies on the camera for selective movement to operative position relative to the camera, and a view-finder mounted on said camera with its focal axis spaced from and substantially parallel to the focal axis of the operative camera lens assembly and having at one end thereof an adjustable lens assembly adjacent said operative camera lens assembly, means providing a pivotal connection between said view-finder and said camera spaced axially of said view-finder from said one end thereof for freedom of movement of said view-finder relative to said camera in a manner to adjust the parallax relationship between the focal axes of said view-finder and operative camera lens assemblies, a manually rotatable shaft disposed between said view-finder and said camera substantially parallel to the focal axis of said operative camera lens assembly and journalled in bearings carried by said camera, gears on said shafts selectively engaged by the gears on said camera lens assemblies as said camera lens assemblies are selectively moved to operative position relative to the camera for adjusting the focus of said operative camera lens assembly by rotation of said shaft, intermeshing gears mounted one on said shaft and one on said view-finder lens assembly for simultaneously adjusting the focus of said view-finder lens assembly when the focus of said operative camera lens assembly is adjusted, the gear on said view-finder lens assembly having the shape of a spiral cam for moving said view-finder about said pivotal connection to adjust the parallax relationship between the axes of said operative camera lens assembly and said view-finder lens assembly as the focus of said lens assemblies is simultaneously adjusted, and resilient means connected between said camera and said view-finder maintaining said intermeshing gears in mesh with each other.

5. In combination with a camera having lens assemblies of different focal lengths each provided with a focusing gear, and means supporting said lens assemblies on the camera for selective movement into operative position relative to the camera, a bracket mounted on said camera, an elongated view-finder having a view-finder lens assembly on one end thereof adjacent the operative camera lens assembly pivotally mounted on said bracket at a location spaced axially along said view-finder from said one end thereof, said view-finder lens assembly having its focal axis spaced from and substantially parallel to the focus axis of said operative camera lens assembly and said view-finder having freedom of swinging movement about its pivotal connection with said bracket to adjust the parallax relationship between the focal axes of said operative camera lens assembly and said view-finder lens assembly, a manually rotatable shaft journalled on said bracket and disposed between said view-finder and said camera substantially parallel to the focal axis of said operative camera lens assembly, gears on said shaft selectively engaged by the focusing gears on said camera lens assemblies as said camera lens assemblies are selectively moved to operative position relative to said camera for focusing the operative camera lens assembly by rotation of said shaft, intermeshing gears provided one on said shaft and one on said view-finder lens assembly for focusing said view-finder lens assembly as said operative camera lens assembly is focused, at least one of said intermeshing gears having the shape of a spiral cam for moving said view-finder about the pivotal connection between said view-finder and said bracket to adjust the parallax relationship between the focal axes of said operative camera lens assembly and said view-finder lens assembly as said lens assemblies are simultaneously focused, and resilient means connected between said camera and said view-finder maintaining said intermeshing gears in mesh with each other.

6. In combination with a camera having a camera lens assembly provided with a focusing gear, a bracket mounted on said camera, an elongated view-finder having at one end a view-finder lens assembly disposed adjacent said camera lens assembly with its focal axis spaced from and substantially parallel to the focal axis of said camera lens assembly, means providing a pivotal connection between said view-finder and said bracket at a location spaced axially of said view-finder from said one end thereof to provide freedom of swinging movement of said view-finder about said pivotal connection for adjustment of the parallax relationship between the focal axes of said camera lens assembly and said view-finder lens assembly, a manually rotatable shaft journalled on said bracket between said camera and said view-finder and disposed substantially parallel to the focal axis of said view-finder lens assembly, a gear on said shaft meshing with the focusing gear on said camera lens assembly, intermeshing gears mounted one on said shaft and one on said view-finder lens assembly for focusing said view-finder lens assembly when said camera lens assembly is focused by rotation of said shaft, one of said intermeshing gears having the shape of a spiral cam for moving said view-finder about said pivotal connection to adjust the parallax relationship between the focal axes of said lens assemblies as said lens assemblies are simultaneously focused, and resilient means connected between said camera and said view-finder maintaining said intermeshing gears in mesh with each other.

LEROY F. FACHMAN.

References Cited in the file of this patent

UNITED STATES PATENTS

| Number | Name | Date |
|---|---|---|
| 1,796,725 | Ross | Mar. 17, 1931 |
| 1,920,072 | Ginsberg | July 25, 1933 |
| 2,012,515 | Mitchell | Aug. 27, 1935 |
| 2,026,675 | Edwards | Jan. 7, 1936 |
| 2,322,399 | Sperry et al. | June 22, 1943 |
| 2,482,628 | Little | Sept. 20, 1949 |
| 2,519,195 | Maurer | Aug. 15, 1950 |

FOREIGN PATENTS

| Number | Country | Date |
|---|---|---|
| 531,524 | France | Oct. 26, 1921 |
| 705,829 | France | Mar. 17, 1931 |
| 427,476 | Great Britain | Apr. 16, 1935 |
| 908,653 | France | Oct. 11, 1945 |